United States Patent [19]

Ackel

[11] 4,226,461
[45] Oct. 7, 1980

[54] FASTENING ARRANGEMENT FOR REMOVABLE STORAGE SERVICES

[75] Inventor: Sabet Ackel, Stuttgart, Fed. Rep. of Germany

[73] Assignee: Daimler-Benz Aktiengesellschaft, Fed. Rep. of Germany

[21] Appl. No.: 941,909

[22] Filed: Sep. 13, 1978

[30] Foreign Application Priority Data

Sep. 15, 1977 [DE] Fed. Rep. of Germany ....... 2741540

[51] Int. Cl.³ .............................................. P60R 5/04
[52] U.S. Cl. ............................... 296/37.14; 296/37.16
[58] Field of Search .............. 296/37.14, 37.16, 137 B; 49/463, 465, 466; 16/171

[56] References Cited

U.S. PATENT DOCUMENTS

| | | | |
|---|---|---|---|
| 3,291,520 | 12/1966 | Smith | 296/37.16 |
| 3,325,207 | 6/1967 | Anderson et al. | 296/37.14 |
| 3,659,894 | 5/1972 | Dodgen et al. | 296/37.14 |

Primary Examiner—Robert R. Song
Attorney, Agent, or Firm—Craig & Antonelli

[57] ABSTRACT

A fastening arrangement for a removable cargo floor provided with a covering such as a carpet in vehicles, especially in station wagons, in which the cargo floor rests on a mounting frame formed at least in part by bearers. A fastening construction is provided which, on the one hand, locks the cargo floor in the vertical direction by at least one lug engaging under prestress in a guide opening of the mounting frame and by at least one detent mechanism arranged opposite this lug, and on the other hand, retains the cargo floor in the horizontal position by causing the carpet pulled over all of the edges of the cargo floor to abut under pressure at the vertically extending frame part of the mounting frame which is also provided with a carpeted surface.

19 Claims, 1 Drawing Figure

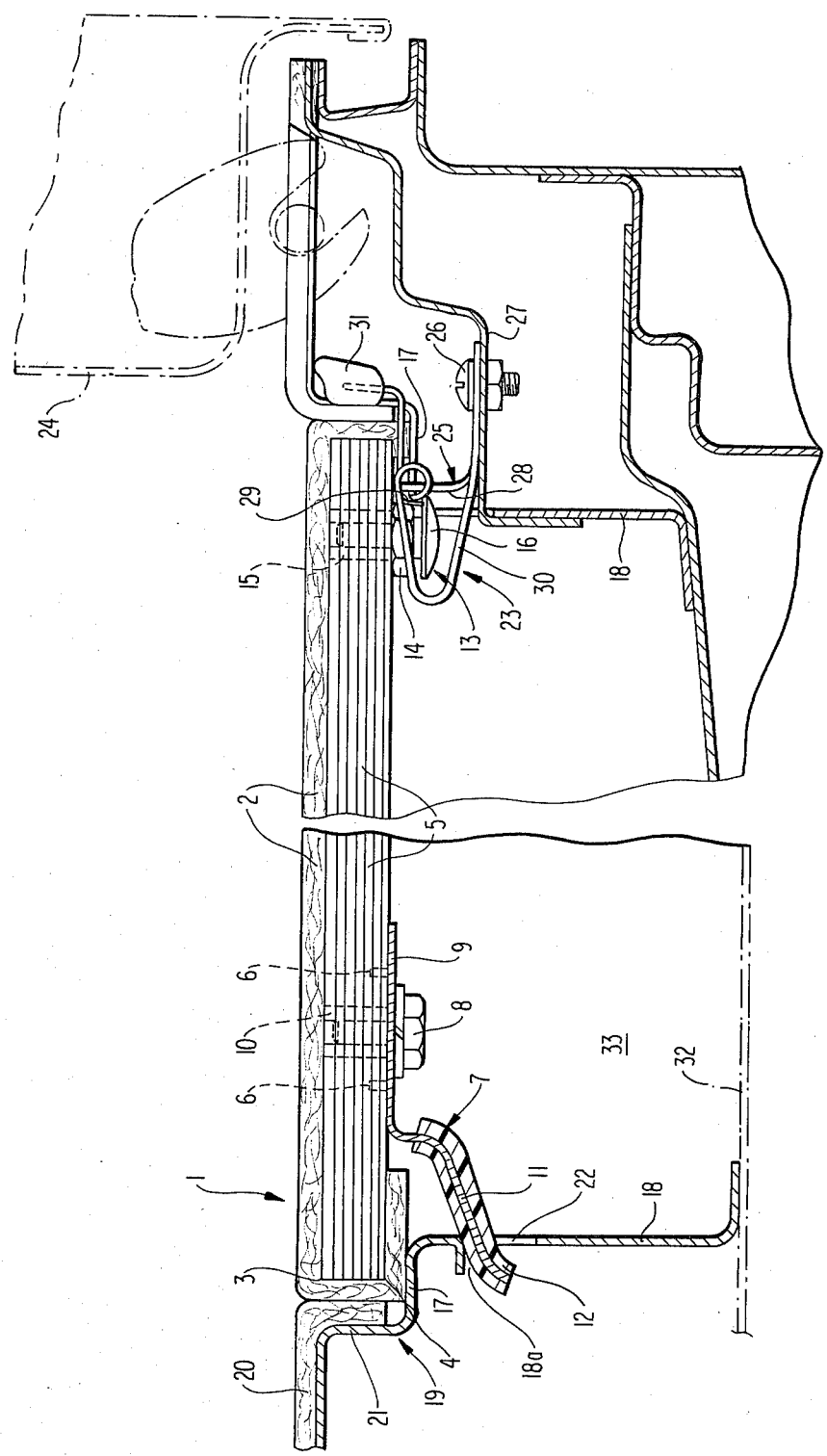

FASTENING ARRANGEMENT FOR REMOVABLE STORAGE SERVICES

The present invention relates to a fastening arrangement for removable storage or cargo floors provided with a covering, preferably with a carpet, in vehicles, especially in station wagons, whereby the storage floors rest on a support frame formed at least partially of bearers of the vehicle.

It is customary in station wagons to fasten or lock cargo or storage floors at bearer parts of the vehicle by way of hinges or by way of projecting conically formed bolts which engage into a correspondingly formed aperture of the bearer part. Additionally, the fastening takes place by means of threaded members or by means of a handle located in a recess of the cargo floor.

Therebeyond, the storage or cargo floor together with its carpet glued onto the cargo surface is framed-in by U-shaped profiles consisting of aluminum which are intended to protect the carpet against fraying.

Constructions of this type are very expensive and considerably increase the cost of the vehicle.

The present invention is therefore concerned with the task to provide an invisible fastening arrangement by the use of low-cost means which renders the storage or cargo floor rattle-free both in the horizontal as also in the vertical direction.

The underlying problems are solved according to the present invention in that fastening means are provided which, on the one hand, lock the cargo floor in the vertical direction at least one lug engaging under prestress in a guide opening of the mounting frame and by at least one detent mechanism disposed opposite this lug and which, on the other hand, retain the cargo floor in the horizontal position with the carpet folded about all of the edges of the cargo floor abutting under pressure at the vertically extending frame part of the mounting frame also provided with a carpet.

A vibration-free and rattle-free cargo or storage floor is created by the measures in accordance with the present invention which, notwithstanding frequent removal out of the mounting frame or insertion into the same, the carpet on the cargo or storage floor neither frays nor is prone to other damages or operational disturbances.

In prior art constructions, existing rubber pads or rubber profiles are damaged by repeated insertion of the cargo floor into the frame so that sheet metal rests on sheet metal or wood on sheet metal and causes unbearable rattle noises in the passenger space.

In a preferred embodiment of the present invention, at least the part of the lug in contact with the guide opening of the mounting frame is covered with rubber whereas the part of the lug which is secured at the cargo floor by means of a threaded connection, is provided with claws forced into the cargo floor.

Only one fastening screw is required owing to the use of the claws which prevent a rotation of the lug.

In order to protect the rubber against damages, provision is additionally made according to the present invention that the part of the lug projecting into the guide opening abuts at a bent-off abutment flange in the guide opening.

In an advantageous construction of the present invention, the snap-in lock may consist of an essentially U-shaped spring element secured on the side of the body and having a retaining tongue and a push-button-type latching member, whereby an adjustable locking member secured under the cargo floor snaps-in or engages with the retaining tongue in the locking position whereas it disengages therefrom again when depressing the latching member.

Provision is made as a further advantageous feature of the present invention that the locking member is constructed as a conventional locking bolt whose cup head or mushroom head is in engagement with the retaining tongue.

For the purpose of simple removal of the cargo floor out of the mounting frame, it is proposed according to the present invention that spring arms which are bent V-shaped, project from the spring element, whose free ends abut under prestress as the locked cargo floor.

As a result of this arrangement, the cargo floor during the unlocking is so far lifted on one side by the prestressed spring arms that it is possible to grip the cargo floor from below. Installed handles on the cargo floor thereby become superfluous.

In order to avoid bulges in the cargo floor for the actuation of the latch member, provision is made in an advantageous manner to arrange the push-button-type latch member within the area of the lock housing underneath the hatch-back door.

Accordingly, it is an object of the present invention to provide a fastening arrangement for cargo floors in vehicles provided with carpets, especially in station wagons, which avoids by simple means the aforementioned shortcomings and drawbacks encountered in the prior art.

Another object of the present invention resides in a fastening arrangement for removable cargo floors provided with carpets in vehicles, especially in station wagons, which are simple in construction and relatively low in cost.

A further object of the present invention resides in a fastening arrangement for removable cargo floors in vehicles of the type described above, which is invisible and capable of retaining the cargo floor both in the horizontal as also in the vertical direction without rattles.

A still further object of the present invention resides in a fastening arrangement of the type described above which ensures a vibration-free and rattle-free cargo floor for station wagons whose carpet does not fray notwithstanding frequent removal out of or insertion into its mounting frame.

Still a further object of the present invention resides in a fastening arrangement for removable carpeted cargo floors in vehicles provided with carpeted floors, especially in station wagons, which is not prone to damages of the carpet or operational difficulties.

Another object of the present invention resides in a fastening arrangement for removable cargo floors provided with carpets in vehicles, especially in station wagons, which requires relatively few parts, yet assures maximum protection against damage to any of its parts, and which is highly effective for its intended purposes.

A further object of the present invention resides in a fastening arrangement for removable cargo floors in vehicles provided with carpeting, especially in station wagons, which permits a simple removal of the cargo floor out of the mounting frame without the need of the installation of handles.

These and other objects, features and advantages of the present invention will become more apparent from the following description when taken in connection with the accompanying drawing which shows, for purposes of illustration only, one embodiment in accordance with the present invention and wherein:

The single FIGURE is a cross-sectional view through a removable cargo floor provided with carpeting according to the present invention installed in a station wagon.

Referring now to the single FIGURE of the drawing, a cargo or storage floor consisting of wood and generally designated by reference numeral 1 for a station wagon is provided with a one-piece carpet 2 glued onto the cargo floor. The carpet 2 is pulled around the sharp edges 3 and 4 up to the bottom side 5 of the cargo floor 1.

Two lugs generally designated by reference numeral 7, disposed at a distance from one another are each provided with two claws 6. The lugs 7 are constructed as springs and are each secured at the bottom side 5 of the cargo floor 1 by a bolt 8. The claws 6 which project upwardly from the fastening part 9 of the spring lug 7 are forced or pressed into the wood and prevent a rotation of the spring lug 7. Screw-in nuts 10 assure for a permanent, secure seating of the spring lug 7. The S-shaped part 11 of the spring lug 7 which extends down at an inclination is provided with a rubber hose 12.

A part of a snap-in lock constructed as detent mechanism generally designated by reference numeral 23, namely, a lock bolt generally designated by reference numeral 13 which projects out of the cargo floor 1 and includes a counter nut 14, is disposed on the opposite side of the spring lug 7. The lock bolt 13 is also screwed into a screw-in nut 15 provided in the cargo floor 1. The oval head 16 of the lock bolt 13 serves as locking member.

The cargo floor 1 rests with its carpet 2, which is constructed edge-strip-like on the bottom side 5, relatively softly on the shoulder 17 of a mounting frame generally designated by reference numeral 19 assembled at least in part of vehicle bearers 18. The adjacent body floor is also covered with a carpet 20 which is pulled about the corner of the body floor approximately up to the lower end of the vertically extending frame portion 21 of the mounting frame 19. Thus, carpet 2 abuts at carpet 20. The wood cargo floor 1, which is constructed relatively large, is so dimensioned that the coarse body tolerances can be compensated by the carpet fibers or bristles engaging into one another from two sides. Gaps can hardly be seen since the cargo floor 1 is inserted into the mounting frame under a certain pressure.

The freedom of movement of the cargo floor 1 in the vertical direction is prevented by the lugs 7 engaging under prestress into guide openings 22 of the bearer 18 and by the oppositely disposed snap-in lock 23. The guide openings 22 are each provided in the upper area with abutment flanges 18a whose curved portions serve as abutment surfaces for the part 11 provided with the rubber hose 12. In this manner, damages are prevented at the rubber hose 12. The counter-piece to the locking member, respectively, to the lock bolt 13 screwed into the cargo floor 1 is located at the rear end of the vehicle within the area of the lock housing (not shown) under the hatch-back door 24 which is indicated in dash and dotted lines in the drawing. This counter member is constructed as spring element generally designated by reference numeral 25 and is secured at a bearer member 27 by means of two screws 26.

The spring element 25 consists of a central leg 28 bent essentially U-shaped and having a retaining tongue 29 for the locking member and of two lateral legs 30 which have essentially a V-shaped configuration.

The locking member, more particularly, the flat oval head 16 of the locking bolt 13 lockingly engages with the retaining tongue 29. The center leg 28 is provided at its free end with a push-button type latch member 31, which, when depressed, causes the retaining tongue 29 to move away from the oval head 16 of the locking bolt 13 and thereby releases the same. Simultaneously therewith, the legs 30 constructed as spring legs and abutting at the cargo floor 1 under prestress effect a unilateral lifting of the cargo floor 1 which can now be seized manually and can be removed in a direction opposite the driving direction. The lugs 7 are thereby pulled out of the guide openings 22. The insertion of the cargo floor 1 into the mounting frame 19 takes place in the reverse sequence whereby, however, the engagement of the locking bolt 13 is achieved exclusively by pressing the cargo floor 1 down.

The latch member 31 is accessible only when the hatch-back door 24 is open.

With cargo floors of this type having invisible fastening means and unlocking parts, an altogether nearly gapless cargo surface without handle recesses and handles is achieved which, from a practical and optical point of view, is very effective and meaningful.

The space 33 disposed between the cargo floor 1 and the sheet metal member 32 of the vehicle can be utilized as storage space to tools, luggage or the like.

The snap-in lock 23 is possibly suitable also for locking tiltable, respectively, foldable, spare seats.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A fastening arrangement for a removable cargo floor provided with a covering in a vehicle, the cargo floor being adapted to rest on a mounting frame means formed at least in part of vehicle bearer members, characterized in that the fastening arrangement includes fastening means for locking the cargo floor in a vertical direction and for retaining the cargo floor in a horizontal position so that a covering pulled over all edges of the cargo floor abuts under pressure at a vertically extending frame part of a mounting frame means also provided with a covering, fastening means includes at least one lug means adapted to be mounted on the cargo floor for engagement under prestress into a guide opening of a mounting frame means of a vehicle and at least one detent means adapted to be arranged on the cargo floor oppositely to said lug means.

2. A fastening arrangement according to claim 1, characterized in that the covering is a carpet.

3. A fastening arrangement according to claim 2, characterized in that the vehicle is a station wagon.

4. A fastening arrangement according to claim 1, characterized in that a first part of the lug means is adapted to contact the guide opening of the mounting frame means, a rubber-like materal is provided over said first part of said lug means, and in that a further part of the lug means is adapted to be secured at the cargo floor by threaded means, said further part is provided with claw means adapted to be pressed into the cargo floor.

5. A fastening arrangement according to claim 4, characterized in that the first part of the lug means is adapted to abut at a bent abutment flange in the guide opening.

6. A fastening arrangement according to claim 5, characterized in that the detent means is constructed as a snap-in lock and includes a spring means having a retaining tongue and a latch means, said spring means being essentially U-shaped and being adapted to be fastened at a relatively fixed part of the vehicle, and in that a locking member adapted to be secured under the cargo floor engages with the retaining tongue in a locking position of the cargo floor and again disengages therefrom upon an actuation of the latch means.

7. A fastening arrangement according to claim 6, characterized in that means are provided for adjusting the locking member.

8. A fastening arrangement according to claim 6, characterized in that the locking member comprises a locking bolt having an oval head engageable with the retaining tongue.

9. A fastening arrangement according to claim 8, characterized in that the spring means includes outwardly projecting V-shaped spring arms, and in that free ends of the spring arms are adapted to abut under prestress at a locked cargo floor.

10. A fastening arrangement according to claim 9, for a vehicle having a hatch-back door including lock means having a lock housing characterized in that the latch means is adapted to be arranged within an area of the lock housing of the hatch-back door.

11. A fastening arrangement according to claim 10, characterized in that the latch means is adapted to be depressed for releasing the detent means.

12. A fastening arrangement according to claim 11, characterized in that the covering is a carpet.

13. A fastening arrangement according to claim 12, characterized in that the vehicle is a station wagon.

14. A fastening arrangement according to claim 1, characterized in that the detent means is constructed as a snap-in lock and includes a spring means having a retaining tongue and a latch means, said spring means being essentially U-shaped and being adapted to be fastened at a relatively fixed part of the vehicle, and in that a locking member adapted to be secured under the cargo floor engages with the retaining tongue in a locking position of the cargo floor and again disengages therefrom upon an actuation of the latch means.

15. A fastening arrangement according to claim 14, characterized in that the latch means is adapted to be depressed for releasing the detent means.

16. A fastening arrangement according to claim 14, characterized in that means are provided for adjusting the locking member.

17. A fastening arrangement according to claim 14, characterized in that the locking member comprises a locking blot having an oval head engageable with the retaining tongue.

18. A fastening arrangement according to claim 14, characterized in that the spring means includes outwardly projecting V-shaped spring arms, and in that free ends of the spring arms are adapted to abut under prestress at a locked cargo floor.

19. A fastening arrangement according to claim 14, for a vehicle having a hatch-back door including lock means having a lock housing characterized in that the latch means is adapted to be arranged within an area of the lock housing of the hatch-back door.

* * * * *